US012572604B2

(12) United States Patent　　　(10) Patent No.: US 12,572,604 B2

Hashimoto　　　　　　　　　　　(45) Date of Patent: Mar. 10, 2026

---

(54) VEHICLE DATA COLLECTION SYSTEM AND METHOD INCLUDING RELIABILITY INFORMATION FOR A STORAGE UNIT FOR STORING PARTIAL LOG DATA

(71) Applicant: Woven by Toyota, Inc., Tokyo (JP)

(72) Inventor: Daisuke Hashimoto, Chofu (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 724 days.

(21) Appl. No.: 17/489,792

(22) Filed: Sep. 30, 2021

(65) Prior Publication Data

US 2023/0104010 A1　　Apr. 6, 2023

(51) Int. Cl.
*G06F 16/907*　　　(2019.01)
*G06F 16/18*　　　(2019.01)
*G06F 16/9035*　　(2019.01)

(52) U.S. Cl.
CPC ........ *G06F 16/907* (2019.01); *G06F 16/1805* (2019.01); *G06F 16/9035* (2019.01)

(58) Field of Classification Search
CPC .... G06F 16/907; G06F 16/908; G06F 16/909; G06F 16/9035; G06F 16/903; G06F 16/1805
See application file for complete search history.

(56) References Cited

U.S. PATENT DOCUMENTS

| | | | | |
|---|---|---|---|---|
| 7,058,722 B2 * | 6/2006 | Ikami | ...................... | H04L 67/02 |
| | | | | 709/213 |
| 8,644,339 B1 * | 2/2014 | Krishna | .............. | H04W 28/065 |
| | | | | 370/474 |
| 10,019,904 B1 * | 7/2018 | Chan | .................. | G06Q 10/0635 |
| 10,621,049 B1 * | 4/2020 | Certain | .............. | G06F 11/1466 |
| 10,769,220 B1 * | 9/2020 | Chang | .................. | G06F 16/951 |
| 10,916,075 B1 * | 2/2021 | Webster | .............. | G09B 19/167 |
| 11,250,069 B1 * | 2/2022 | Bianchi | .............. | G06F 16/9038 |
| 11,409,457 B1 * | 8/2022 | Varghese | ............ | G06F 11/2038 |
| 12,147,678 B2 * | 11/2024 | Dalmatov | ............. | G06F 3/0679 |

(Continued)

FOREIGN PATENT DOCUMENTS

| | | |
|---|---|---|
| JP | 2011103077 A | 5/2011 |
| JP | 2013-228843 A | 11/2013 |

(Continued)

*Primary Examiner* — Vaishali Shah

(74) *Attorney, Agent, or Firm* — HAUPTMAN HAM, LLP

(57) ABSTRACT

A vehicle data collection system includes a sensor configured to collect data; a non-transitory computer readable medium configured to store instructions, an application log, and a system log thereon; and a processor. The processor is configured to execute the instructions for receiving the collected data from the sensor, the application log or the system log; and generating log data based on the collected data. The processor is configured to execute the instructions for separating the log data into a plurality of partial log data; and generating metadata for each of the plurality of partial log data. The metadata includes reliability information for a portion of a storage unit where corresponding partial log data of the plurality of partial log data will be stored. The processor is configured to execute the instructions for instructing the storage unit to store each of the plurality of partial log data in the storage unit.

18 Claims, 6 Drawing Sheets

(56) References Cited

U.S. PATENT DOCUMENTS

| | | | | |
|---|---|---|---|---|
| 2005/0238054 | A1* | 10/2005 | Sharma | H04L 1/1642 |
| | | | | 370/473 |
| 2006/0155917 | A1* | 7/2006 | Di Sena | G11C 16/349 |
| | | | | 711/E12.008 |
| 2007/0174549 | A1* | 7/2007 | Gyl | G06F 12/0646 |
| | | | | 711/115 |
| 2010/0067036 | A1* | 3/2010 | Oka | G06Q 30/04 |
| | | | | 358/1.14 |
| 2014/0128057 | A1* | 5/2014 | Siomina | H04W 56/00 |
| | | | | 455/423 |
| 2017/0024140 | A1* | 1/2017 | Shivanand | G06F 3/065 |
| 2017/0075922 | A1* | 3/2017 | Torman | G06F 16/2358 |
| 2019/0189227 | A1* | 6/2019 | Yang | G11C 16/349 |
| 2020/0327014 | A1* | 10/2020 | Creed | G06F 11/1092 |
| 2021/0297395 | A1* | 9/2021 | Ruparel | H04L 9/065 |

FOREIGN PATENT DOCUMENTS

| | | |
|---|---|---|
| JP | 2017-139680 A | 8/2017 |
| JP | 2017-168981 A | 9/2017 |
| JP | 201855191 A | 4/2018 |

* cited by examiner

200

Fig. 3 log data 300

| partial log data 202 | partial log data 202 | partial log data 202 | ... | partial log data 202 |

300

400

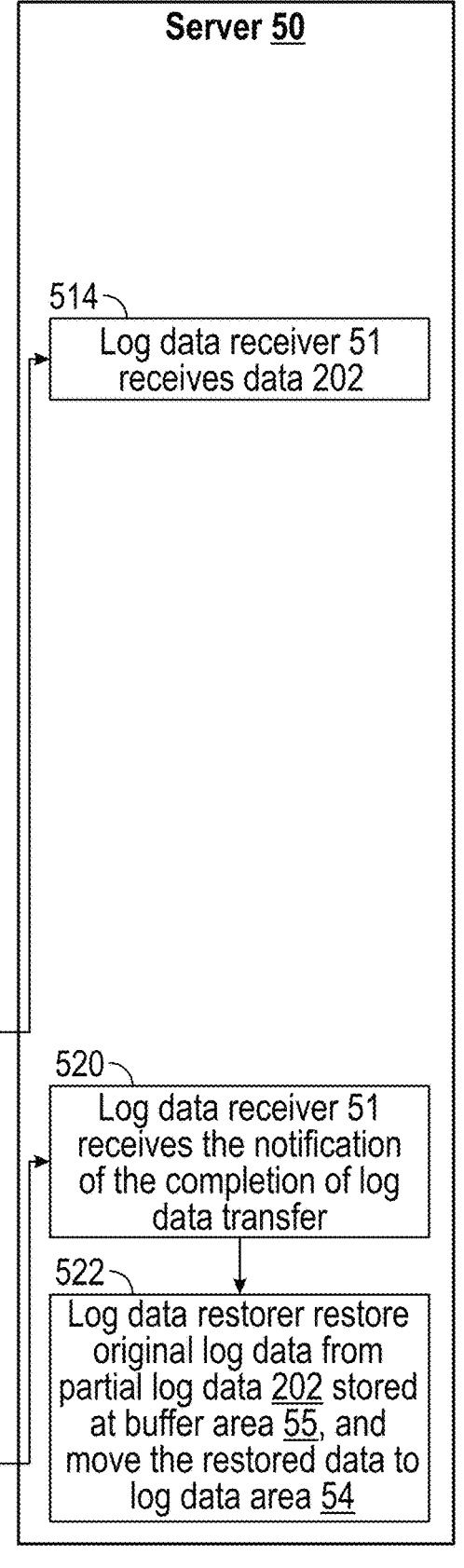

500

Vehicle System   VS

502 — Log management unit 4 generates partial log data 202

504 — Stream ID mapper 20 maps stream ID to the data

506 — Metadata generator 21 generates metadata

508 — Storage manager 22 writes the partial log data and the metadata to block 102

510 — Is there a block that requires static wear levelling soon ?    No

Yes

512 — Uploading processor 23 sends partial log data 202 stored at the block that requires static wear leveling soon 516 — Is sending all of log data completed ?    No

Yes

518 — Upload completion notifier 24 sends a notification of the completion of log data transfer

Server 50

514 — Log data receiver 51 receives data 202

520 — Log data receiver 51 receives the notification of the completion of log data transfer 522 — Log data restorer restore original log data from partial log data 202 stored at buffer area 55, and move the restored data to log data area 54

FIG. 5

VEHICLE DATA COLLECTION SYSTEM AND METHOD INCLUDING RELIABILITY INFORMATION FOR A STORAGE UNIT FOR STORING PARTIAL LOG DATA

BACKGROUND

Vehicles include a variety of sensors that collect data related to both the vehicle and an environment surrounding the vehicle. The collected data is stored in a memory within the vehicle. In some instances, the stored information is transferred to a server for separate storage or analysis.

In some instances, an ability to transfer stored information from a vehicle to a server is inhibited, for example, by connectivity issues. As a result, collected data accumulates within the vehicle memory. In some instances, an amount of collected data between transfers to the server exceeds a storage capacity of the memory within the vehicle.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 is a block diagram of log data for a vehicle data collection system in accordance with some embodiments.

FIG. 5 is a flowchart of a method of using a vehicle data collection system in accordance with some embodiments.

DETAILED DESCRIPTION

Figure 1:
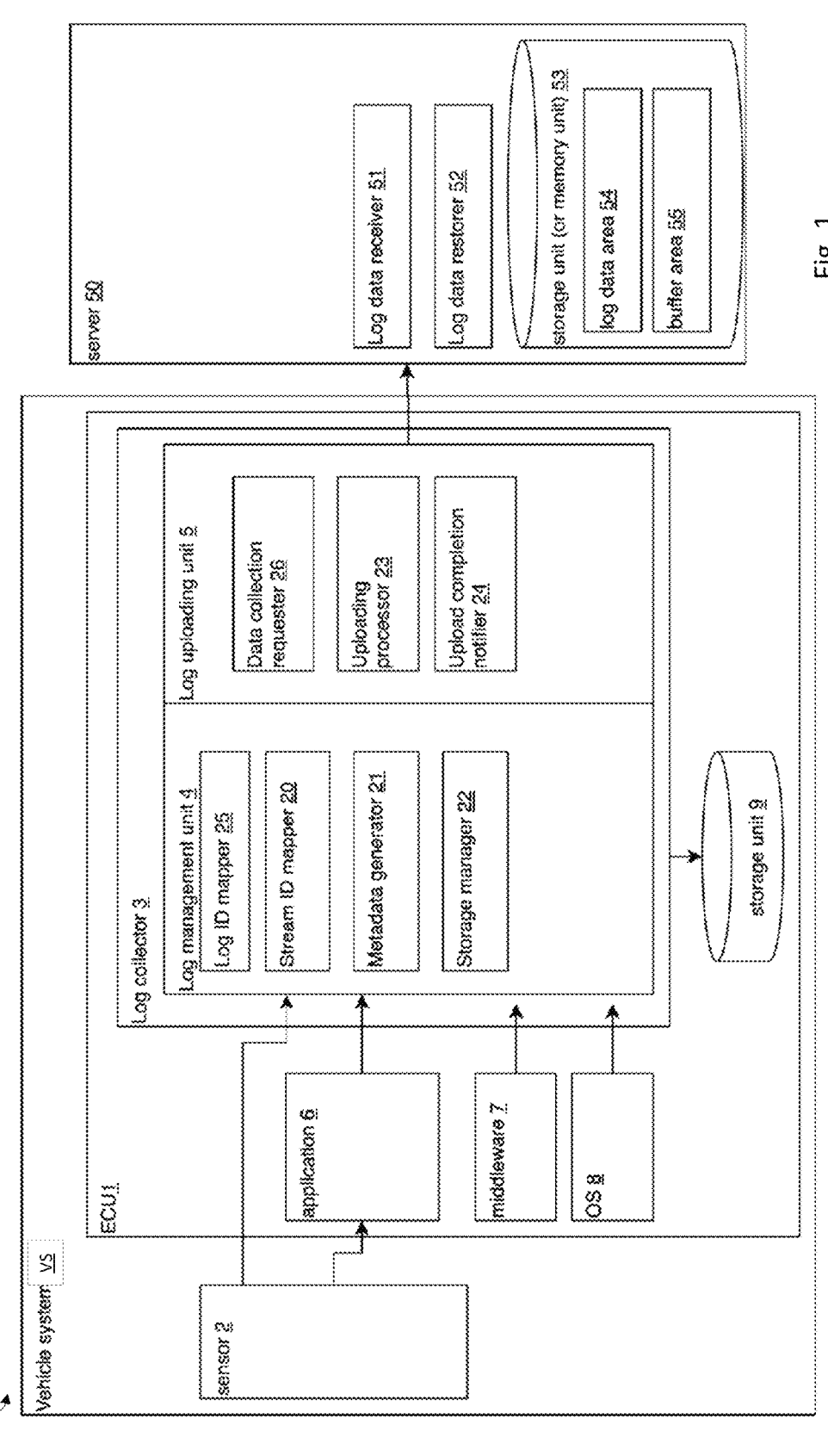
FIG. 1 is a schematic view of a vehicle data collection system in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As vehicles include more sensors and include more electronic components, requests for data collected from the sensors increase. The increased amount of data requests includes not only data requests from components within the vehicle, but also from external devices or users seeking the data collected by the sensors. During normal operation, the collected data is temporarily stored in a memory within the vehicle and then uploaded to a remote device, such as a server. However, in some instances, connectively problems prevent or reduce an ability of a vehicle to upload data from the memory within the vehicle to the server.

Connectivity issues arise from a variety of different situations. In some instances, environmental conditions prevent or reduces the use of satellites or other antennae from being able to relay the data from the vehicle to the server. In some instance, hardware failure within the vehicle or as part of a communication system to which the vehicle is connected prevents or reduces the ability to upload the data from the vehicle. In some instances, the server is off-line and unable to receive or process new information. Due to factors such as these, occasions exist where collected data stored in the vehicle memory waiting to be uploaded exceeds a storage capacity of the vehicle memory.

In order to address a situation where collected data awaiting uploading exceeds the storage capacity of the vehicle memory, criteria are used for identifying portions of the collected data to be preferentially transmitted to the server in order to increase available space or preserve the collected data. By including criteria for preferentially transmitting data, a vehicle data collection system, according to some embodiments of the current disclosure, is able to reduce a risk of loss of collected data. Loss of collected data increases a risk of data requests being unanswered or incompletely answered. For example, if a data request associated with a stolen vehicle is transmitted to the vehicle, and the vehicle collects data relevant to this data request but is unable to upload the collected data to the server, a risk that the police will be unable to find the stolen vehicle increases.

In some embodiments, the vehicle data collection system of the current disclosure uses log data to track a priority level of collected data along with other identifying information of the collected data to determine a priority level for transmitting the collected data in the vehicle memory to the server.

The following description is based on a non-limiting example of a vehicle communicating with a server. One of ordinary skill in the art would understand that this description is applicable to multiple vehicles communicating with multiple servers. That is, a single vehicle is able to communicate with multiple servers; and a single server is able to communicate with multiple vehicles.

FIG. 1 is a schematic view of a vehicle data collection system 100 in accordance with some embodiments. The vehicle data collection system 100 includes a vehicle system VS and a server 50. The vehicle system VS is configured to communicate with the server 50. In some embodiments, the communication is wireless communication. In some embodiments, the communication is wired communication. The vehicle system VS is incorporated into a vehicle. In some embodiments, the vehicle is an automobile, such as an autonomous driving automobile, a motorcycle, a golf cart or another suitable vehicle. The server 50 is configured to receive log data from the vehicle system VS. In some embodiments, the vehicle system VS receives a data collection command from the server 50 and sends log data back to the server 50 based on the received data collection command.

In some embodiments, the data collection command includes information related to an object or occurrence for which data is requested. In some embodiments, the data collection command further includes information related to a time period prior to and after the detection of the object or occurrence for which collected data is requested. In some embodiments, the data collection command further includes information related to the type of collected data requested, e.g., image data, location data, proximity data, etc. In some embodiments, the data collection command further includes priority information for raising or lower a priority for responding to the data collection command.

In some embodiments, the log data includes training data, information for debugging software, information for reproducing events associated with the vehicle, test data collected by the vehicle system VS or other suitable information. In some embodiments, the log data is collected in response to a trigger event. A trigger event is an event detected by the vehicle system VS based on collected data from a sensor 2 or internal states of the software in the vehicle system VS that causes the vehicle system VS to begin collecting and analyzing data. For example, in some embodiments, the trigger event includes a traffic accident, receipt of a data collection command, crashing of an application within the vehicle system VS, or another suitable occurrence detectable by the vehicle system VS.

The vehicle system VS includes a sensor 2 configured to capture data of an environment surrounding the vehicle or information related to the vehicle. In some embodiments, the sensor 2 includes a plurality of sensors. The vehicle system further includes an electronic control unit (ECU) 1. The ECU 1 is configured to receive collected data from the sensor 2. The ECU 1 is configured to process the ca collected data. In some embodiments, the sensor 2 includes a visible light camera. In some embodiments, the sensor 2 includes an infrared (IR) camera. In some embodiments, the sensor 2 includes a combination of visible light and IR cameras. In some embodiments, the camera 5 includes a depth sensing camera. In some embodiments, the sensor 2 includes a light detection and ranging (LiDAR) sensor, a radio wave sensor, a radio detection and ranging (RADAR) sensor, a sonar sensor, a GPS sensor, a speed sensor, a microphone, a fuel sensor, an oxygen sensor, a tire pressure sensor, a thermometer another suitable sensor or combinations thereof. In some embodiments, the collected data includes image data, point cloud data, or other suitable data. The ECU 1 processes the collected data in order to determine a priority level of the collected data for storing in a storage unit 9.

The collected data from the sensor 2 is transferred to a log collector 3 and to an application 6 in the ECU 1. One of ordinary skill in the art would recognize that while the description refers to an application 6, the description is applicable to multiple applications running in parallel or in series with one another. The application 6 processes the collected data from the sensor 2 and transfers an output from the application to the log collector 3. In some embodiments, the application 6 includes a self-driving car application (such as an object recognition application, a road recognition application, a vehicle localization application, a path planning application, a vehicle control application), a vehicle performance analyzing application, an entertainment application, a vehicle positioning application, a communication application, another suitable application, or combinations thereof. The type of application 6 is not limited by this description.

The ECU 1 further includes middleware 7 which provides runtime services and communication services for applications 6. In some embodiments, the middleware 7 also provides logging API as a part of the communication services so that the applications 6 can easily output log data to the log collector 3 via a common interface. In some embodiments, the middleware 7 outputs to the log collector 3 the information of internal states and events of the middleware 7 in addition to the log data from the sensors 2 and the applications 6. In some embodiments, the middleware 7 improves an ability of the log collector 3 to process data from a variety of applications 6. In some embodiments, the middleware 7 helps the log collector 3 to generate log data readable by a variety of servers 50. In some embodiments, the middleware 7 includes information to assist the log collector 3 in authenticating data requests from the server 50. Non-limiting examples of the middleware 7 include AUTOSAR Adaptive Platform (AUTOSAR AP), Robot Operating System (ROS), etc., which are usable as a middleware 7.

The ECU 1 further includes an operating system (OS) 8 which provides information to the log collector 3. The OS 8 helps the log collector 3 to implement scheduling and execute functions associated with generation of the log data. In some embodiments, the OS 8 outputs to the log collector 3 the information of internal states, events and system log of OS 8. Non-limiting examples of the OS 8 include Linux OS. QNX™, etc. which are usable as OS 8.

The log collector 3 is configured to generate log data from the information that was received from sensors 2, applications 6, middleware 7 or OS 8, instruct the storage unit 9 to store the log data and transmit the log data to the server 50. The log collector 3 includes a log management unit 4 configured to receive the collected data, generate log data and store the log data in the storage unit 9. The log collector 3 further includes a log uploading unit 5 configured to package the log data and transmit the log data to the server 5. In some embodiments, the log collector 3 generate the log data also from the information of internal states and events of the log collector 3 itself.

In some embodiment, the storage unit 9 is a Solid-State Drive (SSD) or an embedded Multi Media Card (eMMC). In some embodiment, the log collector 3 communicates with storage unit 9 via storage interface such as NVM Express™. For example, in some embodiments, the log collector 3 writes data to the storage unit 9 by using the write command of NVM Express™ and notifies the stream ID to the storage unit 9 by stream identifier at NVM Express™.

The log management unit 4 includes a log identification (ID) mapper 25 configured to assign log ID information to the collected data. The log management unit 4 further includes a stream ID mapper 20 configured to assign stream ID information to the log data from the log ID mapper 25. The stream ID differs depending on a source of the log data, e.g., sensor 2, application 6 or another component. In some embodiments, the stream ID indicates a specific type of sensor, e.g., camera, LiDAR, RADAR, etc., which was used to collect the log data. In some embodiments, the stream ID is allocated by storage unit 9.

The log management unit 4 further includes a metadata generator 21 that is configured to generate metadata associated with each piece of log data. In some embodiments, the metadata includes a metric indicating the log data ID, a wear state of an area of the storage unit 9 where the log data is to be stored, or other suitable metadata. The wear state is an indication of how many times a portion of the storage unit 9 has been erased or overwritten, for example. In some embodiments, the storage unit 9 includes memory cells that have an estimated useful life measured by a number of rewrites the memory cells are able to perform before reliability of data stored in those memory cells becomes unacceptable.

The log management unit 4 is configured to split the log data into a plurality of components. In some embodiments, each of the plurality of components is termed partial log data meaning that the component is less than an entirety of the log data.

The log management unit 4 further includes a storage manager 22 configured to issue a write instruction to the storage unit 9 for associating the log data and the metadata in the storage unit 9. The storage manager 22 is also configured to notify the storage unit 9 of the stream ID associated with the log data to be written to the storage unit 9. The storage manager 22 is configured to instruct the storage unit 9 to store log data having different stream ID information in different blocks. That is, each block in the storage unit 9 includes only log data having a same stream ID (from the same source).

The storage manager 22 is configured to detect a reliability metric of each of the blocks within the storage unit 9. In response to a determination that a reliability metric of a specific block exceeds a threshold, the storage manager 22 is configured to instruct the uploading processor 23 to preferentially transmit partial log data stored in the specific block to the server 50. Following transmission of the partial log data by the uploading processor 23, the partial log data is available for deletion from the storage unit 9. In some embodiments, the partial log data is immediately deleted from the storage unit 9 following transmission to the server 50. In some embodiments, the partial log data made available to be erased or overwritten by new log data to be stored in the storage unit 9 following transmission of the partial log data to the server 50. Examples of the reliability metric and the threshold will be described below.

In some embodiments, the storage manager 22 is configured to instruct the uploading processor 23 to transmit partial log data from a specific block in response to a determination that a difference between an erase count of the specific block and an average erase count of the storage unit 9 exceeds a threshold. An erase count is an indication of how many times the block has been erased. As an erase count increases, reliability of the memory decreases. Therefore, a block of the storage unit 9 having a higher erase count is more likely to experience problems that increase a risk of corruption or loss of data than in a block of the storage unit 9 having a lower erase count. In some embodiments, the storage manager 22 is configured to instruct the uploading processor 23 to transmit partial log data from a specific block in response to a determination that a difference between an erase count of the specific block and a lowest erase count for any block of the storage unit 9 exceeds a threshold. In some embodiments, the storage manager 22 is configured to instruct the uploading processor 23 to transmit partial log data from a specific block in response to a determination that a difference between an erase count of the specific block and a median erase count for any block of the storage unit 9 exceeds a threshold.

In some embodiments, the storage manager 22 is configured to instruct the uploading processor 23 to transmit partial log data from a specific block in response to a determination that a difference between an erase time of the specific block and an average erase time of the storage unit 9 exceeds a threshold. Erase time is a most recent time that a block is erased previously. For example, if the current time is t=140 and a block was erased at t=10, 50, 80, 120, then the erase time is t=120, i.e., the most recent erase time. As the erase time decreases (as erase time is older), a risk of loss of data increases. In some embodiments, the storage manager 22 is configured to instruct the uploading processor 23 to transmit partial log data from a specific block in response to a determination that a difference between an erase time of the specific block and a latest erase time of the storage unit 9 exceeds a threshold. In some embodiments, the storage manager 22 is configured to instruct the uploading processor 23 to transmit partial log data from a specific block in response to a determination that a difference between an erase time of the specific block and a median erase time of the storage unit 9 exceeds a threshold. In some embodiments, the storage manager 22 is configured to instruct the uploading processor 23 to transmit partial log data from a specific block in response to a determination that an erase time of the specific block exceeds a pre-determined threshold.

In some embodiments, the storage manager 22 is configured to instruct the uploading processor 23 to transmit partial log data from a specific block in response to a determination that a difference between a write time of the specific block and an average write time of the storage unit 9 exceeds a threshold. Write time is a most recent write time that the data which is still valid is written to a block. For example, if the current time is t=140 and the data which is still valid was written at t=120, then the write time is t=120, i.e., the most recent write time for still valid data. As the write time decreases (as the duration that the valid data is retained in the block gets longer), a risk of loss of data increases because of data retention failures. In some embodiments, the storage manager 22 is configured to instruct the uploading processor 23 to transmit partial log data from a specific block in response to a determination that a difference between a write time of the specific block and a latest write time of the storage unit 9 exceeds a threshold. In some embodiments, the storage manager 22 is configured to instruct the uploading processor 23 to transmit partial log data from a specific block in response to a determination that a difference between a write time of the specific block and a median write time of the storage unit 9 exceeds a threshold. In some embodiments, the storage manager 22 is configured to instruct the uploading processor 23 to transmit partial log data from a specific block in response to a determination that a write time of the specific block exceeds a pre-determined threshold.

In some embodiments, the storage manager 22 is configured to instruct the uploading processor 23 to transmit partial log data from the log data which has been stored the longest in the storage unit 9 in response to a determination that the storage unit 9 is at full storage capacity. In some embodiments, the storage manager 22 is configured to instruct the uploading processor 23 to transmit partial log data from the log data which has been stored the longest in the storage unit 9 in response to a determination that the storage unit 9 has exceeded a threshold storage capacity.

In some embodiments, the ECU 1 is further configured to track reliability of blocks within the storage unit 9. In some embodiments, reliability of a block of the storage unit 9 is determined based on a number of error bit corrections within the block. For example, error correcting code (ECC) such as Bose-Chaudhuri-Hocquenghem code (BCH code) is usable to correct error bits of the data written in a block when bits are read. When the error bits are corrected, the number of error bits which are corrected by the error correcting code is able to be measured. As a number of detected corrected error bits increases, the less reliable the storage manager 22 determines the block is determined. In some embodiments, the storage manager 22 is configured to instruct the upload-ing processor 23 to transmit partial log data from a block of the storage unit 9 determined to have the corrected error bits above a predetermined threshold. In some embodiments, other ECC such as Low Density Parity Check (LDPC) code, Reed-Solomon code, Turbo code, etc. are usable.

In some embodiments, the storage unit 9 includes one or more blocks having multi-level cells. A multi-level cell is able to store more than one bit. However, as a number of bits within a cell increases, the cell has a lower number of write cycles within the useful life of the cell. In some embodi-ments, the storage manager 22 is configured to instruct the uploading processor 23 to transmit partial log data from blocks of the storage unit 9 which include multi-level cells preferentially over partial log data from blocks having single level cells. In some embodiments, the storage manager 22 is configured to instruct the uploading processor 23 to transmit partial log data from blocks of the storage unit 9 which include multi-level cells configured to store a higher number of bits, e.g., penta-level cells, preferentially over partial log data from blocks having multi-level cells configured to store a lower number of bits, e.g., triple-level cells.

In some embodiments, the storage manager 22 is config-ured to detect an available capacity of each of the blocks within the storage unit 9. In response to a determination that a an available capacity of a specific block is below a second predetermined threshold the storage manager 22 is config-ured to instruct the uploading processor 23 to preferentially transmit partial log data stored in the specific block to the server 50. Following transmission of the partial log data by the uploading processor 23, the partial log data is available for deletion from the storage unit 9. In some embodiments, the partial log data is immediately deleted from the storage unit 9 following transmission to the server 50. In some embodiments, the partial log data is made available to be erased or overwritten by new log data to be stored in the storage unit 9 following transmission of the partial log data to the server 50

By instructing the uploading processor 23 to transmit partial log data instead of an entirety of the log data associated with a log ID, the storage manager 22 is able to increase an amount of available storage in the storage unit 9 for new log data; while minimizing an amount of uploading time consumed by the transmission of the partial log data. This helps to avoid loss of log data stored within the storage unit 9 while still prioritizing transmission of entire log data based on other priority criteria. In some embodiments, the storage manager 22 is configured to select which partial log data stored in the specific block of the storage unit 9 to instruct the uploading processor 23 to transmit based on a reliability metric which was described above. The less reliable the block of the partial data is, higher priority the block has for partial log data transmission. In some embodi-ments, the storage manager 22 is configured to select which partial log data stored in the specific block of the storage unit 9 to instruct the uploading processor 23 to transmit based on a size of the partial log data. In some embodiments, the storage manager 22 is configured to select which partial log data stored in the specific block of the storage unit 9 to instruct the uploading processor 23 to transmit based on the source of the log data such as sensors 2 and applications 6. As a safety criticality of the source of the log data increases, a priority for partial log data transmission increases. For example, if a sensor 2 or an application 6 has higher Automotive Safety Integrity Level (ASIL) such as ASIL-D, transferring data from the source should is prioritized over a sensor 2 or an application 6 having a lower ASIL and Quality Management (QM) level. In some embodiments, the storage manager 22 is configured to select which partial log data in the specific block of the storage unit 9 to instruct the uploading processor 23 to transmit based on a user priority associated with a user that requested the data associated with the partial log data.

The log uploading unit 5 includes an uploading processor 23 configured to transmit log data to the server 50. In response to receiving instructions or a command for log data from the server 50 or the application 6, the uploading processor 23 is configured to transmit the requested log data to the server 50. The data collection requester 26 is config-ured to provide the instructions to the uploading processor 23 for transmitting the log data to the server 50. The uploading processor 23 is further configured to receive instructions from a data collection requester 26 for trans-mitting partial log data to the server 50 preferentially to transmitting log data for fulfilling a data request from the server 50. The uploading processor 23 is further configured to transmit only portions of the log data not previously transmitted in response to receiving instructions from the data collection request 26 to transmit log data after receiving instructions from the storage manager 22 for transmitting partial log data for a same piece of log data. That is, the uploading processor 23 is configured to transmit a first partial log data in response to instructions from the storage manager 22; and to transmit a second partial log data in response to instructions from the data collection requester 26, where the first partial log data and the second partial log data combine to define an entirety of the corresponding piece of log data.

The log uploading unit 5 further includes an upload completion notifier 24 configured to transmit a notification to the sever 50 indicating an entirety of log data for a piece of log data has been transmitted. The notification includes log ID information for the piece of log data that was completely transmitted. For example, in response to the uploading processor 23 receiving instructions from the stor-age manager 22 prior to receiving instructions from the data collection requester 26 for a same piece of log data, the upload completion notifier 24 will transmit a notification to the server 50 of the completion of transfer of the entire piece of log data following the transmission corresponding to the instructions from the data collection requester 26.

The log uploading unit 5 further includes a data collection requester 26 configured to instruct the uploading processor 23 to transmit a selected piece of log data to the server 50. In some embodiments, the data collection requester 26 is configured to select the piece of log data based on a data request, e.g., a data collection command, from the server 50. In some embodiments, the data collection requester 26 is configured to select the piece of log data based on a data collection command, from the application 6 in the vehicle system VS. In some embodiments, the data collection requester 26 is further configured to provide instructions to the log management unit 4 for a type of data to be included in the log data. In some embodiments, the data collection requester 26 is further configured to search and retrieve log data from the storage unit 9 that satisfies a received data request from the server 50. In some embodiments, the data collection requester 26 is configured to prioritize an order in which instructions for transmission of log data is provided to the uploading processor 23 based on information contained in the received data request.

The ECU 1 further includes the storage unit 9. The storage unit 9 is configured to store log data based on instructions received from the log management unit 4. The storage unit 9 includes non-volatile memory, so that information stored in the storage unit 9 is not lost when power to the vehicle ceases, such as by turning off an ignition of the vehicle. In some embodiments, the storage unit 9 includes a solid-state memory or another suitable type of memory.

The server 50 is configured to receive the log data from the vehicle system VS. In some embodiments, the server 50 is further configured to transmit data requests to the vehicle system VS using wireless or wired transmission. The server 50 includes a log data receiver 51 configured to receive log data and partial log data. In response to receiving partial log data, the log data receiver 51 is configured to instruct the storage unit 53 to store the partial log data in a buffer area 55. In response to receiving complete log data, the log data receiver 51 is configured to instruct the storage unit 53 to store the complete log data in log data area 54 and to provide a notification to a user associated with the log data. In some embodiments, the notification includes an alert transmitted to the user via a wired or wireless network. In some embodiments, the notification includes an audio or visual alert. In some embodiments, the notification is sent to a mobile device of the user and the alert is displayed on the mobile device of the user.

The server 50 further includes a log data restorer 52 configured to retrieve partial log data from the buffer area 55 in response to receiving an upload completion notification from the upload completion notifier 24. The log data restorer 52 is configured to use the log ID associated with each of the partial log data components in order to re-constitute the log data in full. In response to completion of the log data being re-constituted, the log data restorer 52 is configured to transfer the log data to the log data receiver 51 to send a notification to the user, as described above. The log data restorer 52 is also configured to instruct the storage unit 53 to store the re-constituted log data in the log data area 54.

The server further includes the storage unit 53 configured to store log data and partial log data received from the vehicle system VS. In some embodiments, the storage unit 53 includes a solid-state memory or another suitable type of memory. The storage unit 53 includes a log data area 54 configured to store complete log data, including re-constituted log data. The storage unit 53 further includes a buffer area 55 configured to store partial log data. In some embodiments, the storage unit 53 is configured to delete partial log data from the buffer area 55 in response to storing complete log data in the log data area 54 having a same log ID. In some embodiments, the storage unit 53 is accessible by the user for receiving the log data. In some embodiments, only the log data area 54 is accessible to the user. In some embodiments, both the log data area 54 and the buffer area 55 are accessible by the user. In some embodiments, the buffer area 55 is only available to select users having a predetermined priority or access level; and user that do not have the predetermined priority or access level are only able to access the log data area 54. In some embodiments, only partial log data having a priority level above a predetermined threshold is accessible in the buffer area 55; and partial log data that does not exceed the predetermined threshold is not accessible in the buffer area. Permitting access, including selective access, to the buffer area 55 helps to provide data to high priority users or high priority data without waiting until all of the data associated with log data is received. Depending on a condition and location of a vehicle a delay between receipt of partial log data and complete log data is an extended period of time, in some instances. Providing partial log data increases a chance that a purpose of the data request corresponding to the partial log data is able to be satisfied. For example, if the police are searching for a stolen vehicle, a single image of a possible matching vehicle and a location where the image is captured increases the chances of the police recovering the vehicle in comparison with a situation where only complete log data that includes numerous images, position information and time information is receive a day or more after the partial log data is available.

Figure 2:
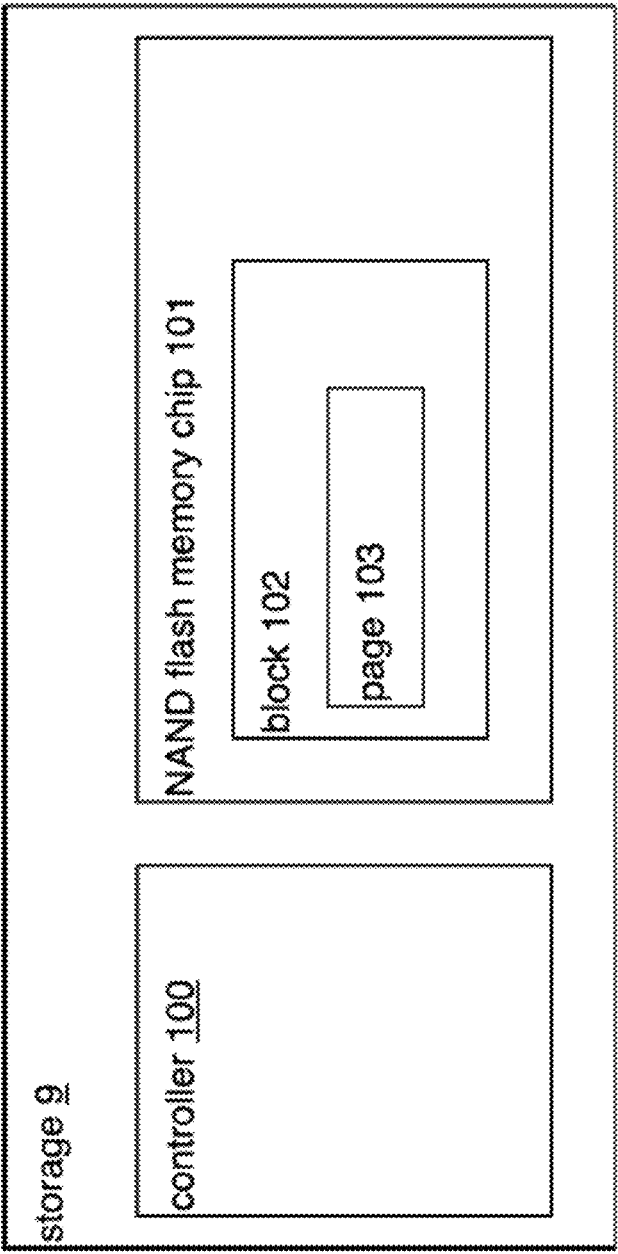
FIG. 2 is a block diagram of a vehicle storage system in accordance with some embodiments.
Figure 3:
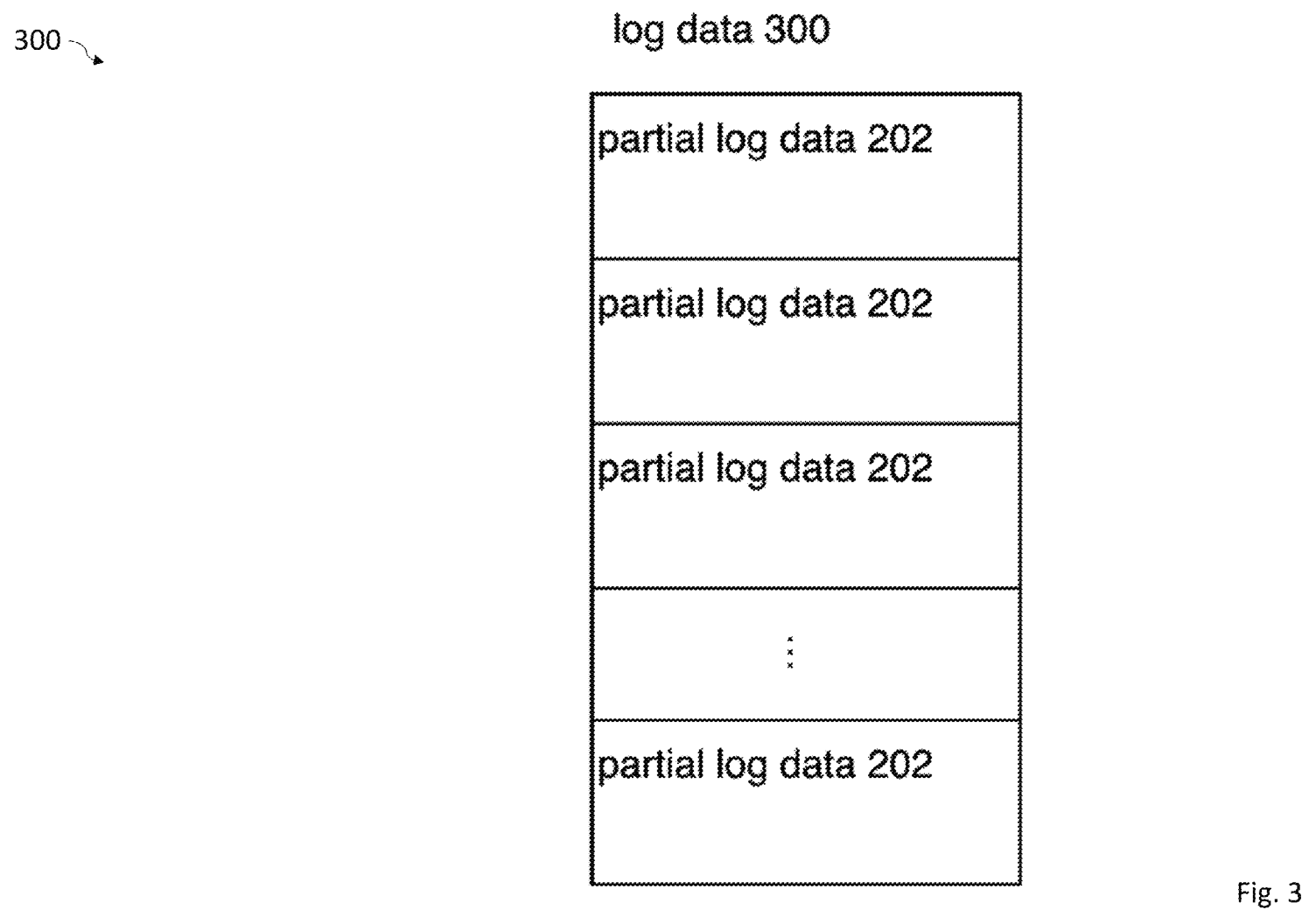

FIG. 2 is a block diagram of a vehicle storage system 200 in accordance with some embodiments. In some embodiments, the vehicle storage system 200 is usable as the storage unit 9 of the vehicle data collection system 100 (FIG. 1). In some embodiments, the vehicle storage system 200 is usable in a data collection system other than the vehicle data collection system 100 (FIG. 1). The storage unit 9 includes a controller 100 and a NAND flash memory chip 101. The NAND flash memory chip 101 includes a block 102, which further includes a page 103. One of ordinary skill in the art would understand that the NAND flash memory chip 101 includes multiple blocks 102 and the block 102 in FIG. 2 is merely for clarity of explanation. Further, one of ordinary skill in the art would understand that each block 102 includes multiple pages 103 and that the page 103 in FIG. 3 is merely for clarity of explanation.

The controller 100 is configured to direct partial log data received from a log management unit, such as log management unit 4 (FIG. 1), to specified portions of the NAND flash memory chip 101. In some embodiments, the controller 100 is further configured to store and update information related to a number of erasing or overwriting processes performed on each block 102 of the NAND flash memory chip 101. For example, the controller 100 is configured to direct partial log data having a same stream ID to blocks 102 within the NAND flash memory chip 101 designated for that stream ID in some embodiments. In some embodiments, the controller 100 is configured to manage metadata, such as metadata 201 (FIG. 4), stored in association with the partial log data to determine a number of erase operations that has occurred in a block 102 and/or a time when the block 102 is erased and is configured to give read access of the metadata 201 to log management unit 4. In some embodiments, the log management unit 4 is configured to manage the metadata, and the controller 100 is configured to access the metadata. In some embodiments, the controller 100 is integrated into the storage unit 9. In some embodiments, the controller 100 is external to the storage unit 9.

The NAND flash memory chip 101 includes memory cells configured to store partial log data and metadata. The memory cells of the NAND flash memory chip 101 are arranged into blocks 102 and pages 103 in order to assist with storing and retrieval of partial log data. One of ordinary skill in the art would recognize that other types of non-volatile memory are usable in places of the NAND flash memory; and that the NAND flash memory chip 101 is merely an exemplary non-volatile memory.

The block 102 is a unit of erase operation of the NAND flash memory chip 101. For example, the size of the block 102 is 16 MBytes. The block 102 is configured to store a partial log data 202 that is mapped to a specific stream ID along with a metadata 201 associated with the partial log data. In some embodiments, the controller 100 allocates a stream ID to a block 102 when the block is allocated or reclaimed for a data write process after an erase process and the controller 100 sends the allocated stream ID to log management unit 4. In some embodiments, stream ID mapper 20 allocates a stream ID to a block 102 when storage manager 22 writes data to storage unit 9. In some embodiments, stream ID is pre-allocated to a group of multiple blocks. In some embodiments, a stream ID is assigned to multiple blocks 102 within the NAND flash memory chip 101. In some embodiments, each stream ID is assigned to a single block 102 in the NAND flash memory chip 101. In some embodiments, each block 102 contains a single piece of partial log data and corresponding metadata. In some embodiments, each block 102 contains multiple pieces of partial log data and corresponding metadata. In some embodiments, all of the partial log data in a block 102 has a same log ID. In some embodiments, at least piece of partial log data in a block 102 has a different log ID from another piece of partial log data in the block 102.

The page 103 is a unit of program operation of the NAND flash memory chip 101. The size of the page 103 is smaller than the size of the block 102. For example, the size of the page 103 is 16 kBytes, in some embodiments. When controller 100 writes the data including the metadata 201 and the partial log data 202 in the block 102, the controller 100 splits the data into smaller pieces of data whose size is the size of the page, and the controller 100 execute a program operation for each page 103 of the block 102 to write the smaller pieces of data to each page 103.

FIG. 3 is a block diagram of log data 300 for a vehicle data collection system in accordance with some embodiments. In some embodiments, the partial log data 202 is stored in a block 102 (FIG. 2) in a storage unit 9 (FIG. 1 and/or FIG. 2). In some embodiments, multiple pieces of the partial log data 202 are stored in a block 102. In some embodiments, the partial log data 202 is stored together in a page 103 (FIG. 2). In some embodiments, the partial log data 202 is stored in multiple pages 103 (FIG. 2). The log data 300 is made of up multiple pieces of partial log data 202. In some embodiments, the log data 300 is stored in multiple blocks 102. In some embodiments, the log data 300 is stored in a single block 102. Each of the pieces of partial log data 202 have a same log ID. In some embodiments, each of the pieces of partial log data 202 have a same stream ID. In some embodiments, at least one piece of the partial log data 202 has a different stream ID from another piece of the partial log data 202. In some embodiments, the log data 300 is split into multiple groups of partial log data 202 and partial log data 202 in the same group has a same stream ID and each group has a different stream ID from other groups. In some embodiments, a number of pieces of partial log data 202 within a complete log data is determined based on a size of the log data 300 and a size of the block 102. In some embodiments, a number of pieces of partial log data 202 within a complete log data 300 is determined based on a number of different stream IDs that make up the log data 300. In some embodiments, additional factors are used instead of or in combination with size and/or stream ID for determining the number of partial log data 202 in a complete log data 300.

Figure 4:
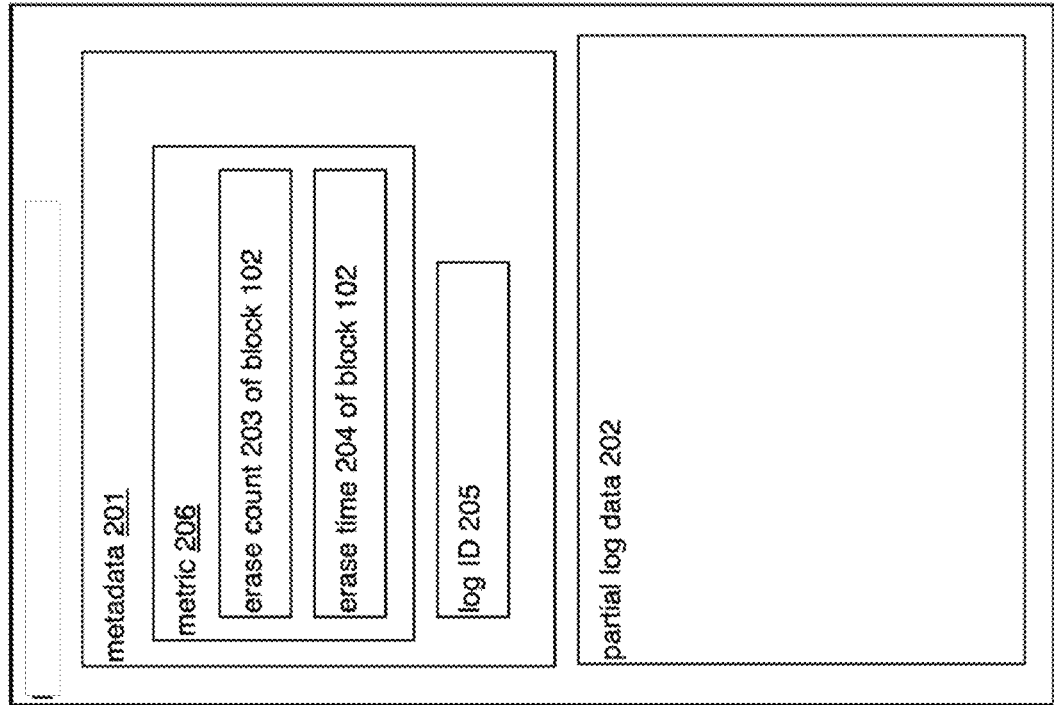
FIG. 4 is a block diagram of a partial log data entry in accordance with some embodiments.

FIG. 4 is a block diagram of a partial log data entry 400 in accordance with some embodiments. The partial log data entry 400 includes both metadata 201 and partial log data 202. The partial log data 202 includes the data collected by a sensor of the vehicle, such as the sensor 2 (FIG. 1). In some embodiments, the partial log data 202 includes an application log data generated by application 6. In some embodiments, the partial log data 202 includes a system log generated by OS 8 or middleware 7. The metadata 201 includes information for identifying and categorizing the partial log data 202. By storing the metadata 201 in association with the partial log data 202, a determination, e.g., using storage manager 22 (FIG. 1), is able to be made regarding whether to preferentially transmit, e.g., using the uploading processor 23 (FIG. 1), the partial log data 202 to a server, e.g., the server 50 (FIG. 1).

The metadata 201 includes log ID information 205, which identifies the log data to which the partial log data 202 is associated. The metadata 201 further includes a metric 206. The metric 206 includes an erase count 203 for a block 102 that the metadata 201 and the partial log data 202 will be written to. The erase count 203 is an indication of how many times the block 102 has been erased. The metric 206 further includes an erase time 204 for a block 102. The erase time 204 is the latest time that the block 102 was erased previously. In some embodiments, the metadata 201 further includes information such as stream ID, other reliability metrics of the block 102, position of the vehicle when the partial log data 202 was collected, a time when the partial log data 202 was collected or other suitable information.

FIG. 5 is a flowchart of a method 500 of using a vehicle data collection system in accordance with some embodiments. The method 500 is able to be implemented by the vehicle data collection system 100 (FIG. 1) and elements used for implementing various steps of the method 500 have the reference number associated with the vehicle data collection system 100. These reference numbers are merely provided for ease of understanding the method 500. One of ordinary skill in the art would recognize that the method 500 is not limited to implementation only on the vehicle data collection system 100 (FIG. 1).

In operation 502 a log management unit, e.g., log management unit 4 (FIG. 1), generates partial log data, e.g., partial log data 202 (FIG. 3) by splitting log data 300 which is generated from the data from sensors 2, the application log data from applications 6 and the system log from OS 8 and middleware 7. In some embodiments, the partial log data is partitioned from log data collected by at least one sensor, e.g., sensor 2 (FIG. 1), in a vehicle. The partial log data is associated with log ID 205 related to the log data corresponding to the partial log data. In some embodiments, the log management unit generates the partial log data by separating data from the log data based on size, sensor type, or other suitable criteria for separating the log data into partial log data.

In operation 504, a stream ID mapper, e.g., stream ID mapper 20 (FIG. 1), assigns a stream ID to each piece of partial log data. In some embodiments, stream ID mapper 20 assigns a different stream IDs to the log data 300 from the different sensors, and assigns the stream ID of the log data 300 to the partial log data 202 which is included in the log data 300. In some embodiments, a fixed stream ID is allocated to each same sensor. The stream ID is associated with the corresponding partial log data for storage, e.g., storage in the storage unit 9 (FIG. 1).

In operation 506, a metadata generator, e.g., metadata generator 21 (FIG. 1), generates metadata associated with the partial log data. In some embodiments, the metadata includes the log ID 205 which is associated with the partial log data. In some embodiments, the metadata includes a metric indicating a wear state of an area of a storage unit, e.g., storage unit 9 (FIG. 1), where the log data is to be stored, or other suitable metadata. The wear state is an indication of how many times a portion of the storage unit has been erased (or overwritten) and/or a most recent time when the storage unit was erased (or overwritten). In some embodiments, the storage unit includes memory cells that have an estimated useful life measured by a number of erasures the memory cells are able to perform before reliability of data stored in those memory cells becomes unacceptable. In some embodiments, the metadata includes information related to a level, i.e., how many bits are storable, of the memory cells in the portion of the storage unit.

In operation 508, a storage manager, e.g., storage manager 22 (FIG. 1) writes the metadata and the partial log data and to a block, e.g., block 102 (FIG. 2). The storage manager is configured to issue a write instruction to the storage unit for associating the partial log data and the metadata in the storage unit. The storage manager is also configured to notify the storage unit of the stream ID associated with the partial log data to be written to the storage unit. The storage manager is configured to instruct the storage unit to store the partial log data having different stream ID information in different blocks. That is, each block in the storage unit includes only partial log data having a same stream ID (from the same source). In some embodiments, a storage manager 22 combines metadata 201 and the partial log data 202 into a single data payload, and sends a single write instruction with the steam ID to the storage unit 9. In some embodiments, a storage manager 22 sends, to the storage unit 9, a write command with a stream ID to write the metadata 201 in a block 102 which is associated with the stream ID, and sends to the storage unit 9 another write command with the same stream ID to write the partial log data 202 in the same block 102. In some embodiments, a storage manager 22 sends to the storage unit 9 a write command with a stream ID to write the metadata 201 in a block 102 which is associated with the stream ID, and sends to the storage unit 9 another write command with the same stream ID to write the partial log data 202 in in another block which is associated with the same stream ID.

Following operation 508, the method 500 returns to operation 502 and another piece of log data is processed and stored in the storage unit as one or more partial log data components.

In operation 510, a determination is made regarding whether a block will soon be subjected to data copy, such as static wear levelling. In some embodiments, the determination is made using the storage manager, e.g., the storage manager 22 (FIG. 1). Static wear leveling is an operation to help equalize the reliability among all blocks 102. For example, when a difference between an erase count of a block 102 and an erase count of another block 102 is large, the wear level (and reliability) of the blocks is different. In some storage devices, the controller of the storage device copies the data in the block which has a smaller erase count to another block which has a larger erase count as a static wear leveling operation so that the reliability of the blocks is more similar. As another example, when the difference between an erase time of a block 102 and an erase time of another block 102 is significant, the reliability of the blocks is different. In some storage devices, the controller of the storage device copies the data in the block which has a smaller erase count to another block which has a larger erase count as a static wear leveling operation so that the reliability of the blocks is more similar. As another example, when the difference between a write time of a block 102 and a write time of another block 102 is significant, the reliability of the written data is different because of the difference of data retention behavior of the blocks. In some storage devices, the controller of the storage device copies the data in the block which has older data to a reclaimed block as a static wear leveling operation so that the reliability of the blocks is more similar. Thus, static leveling operations is an operation that is able to be implemented by controller 100 to equalize the reliabilities of block 102. However, such static leveling operations produce extra data copy which may wear out the block 102 more and which has a negative impact on the performance of the IO of storage 9, in some instances. In some embodiments, storage manager 22 predict the occurrence of the static wear leveling operations by the controller 100 in advance and reduces the amount of static wear leveling operations so that a negative impact on the reliability of storage unit 9 and the negative impact on the IO performance of the storage unit 9 are reduced in comparison with other approaches. In some embodiments, the likelihood of static wear levelling is determined based on an erase count of the block. As a number of erasures of the block increases, the reliability of the block decreases. Therefore, long term storage of information in the block is avoided when possible. In some embodiments, the likelihood of static wear levelling is determined based on an erase time, i.e., the most recent time when the block was erased or overwritten. In some embodiments, the likelihood of static wear levelling is determined based on a write time, i.e., the most recent time when the block was erased or overwritten. In some embodiments, the determination is made in response to the reliability of a block or data of a block being low even if the likelihood of the static wear leveling operation is low. For example, the determination is made by accessing, e.g., using the storage manager, the metadata associated with the partial log data. Other criteria usable for determining whether the block will be subjected to static wear leveling and low reliability, in some embodiments, are discussed above.

In response to a determination that the static wear levelling will not happen soon and the reliability of blocks 102 is acceptable, i.e., a risk of additional data copy of the partial log data is below a predetermined threshold and a risk of loss of the partial log data is below a predetermined threshold, the method 500 repeats operation 510. The method 500 continues to monitor the blocks of the storage unit to determine which, if any, blocks are at risk of static wear levelling or data loss. In response to a determination that the static wear levelling will happen soon, i.e., a risk of additional data copy of the partial log data is at or above the predetermined threshold or in response to a determination that the reliability of a block or data in a block is low, e.g., a risk of loss of the partial log data is at or above the predetermined threshold, the method 500 proceeds to operation 512.

In operation 512, an uploading processor, e.g., uploading processor 23 (FIG. 1), sends the partial log data, e.g., partial log data 202 (FIG. 3), stored in the block that will experience static wear levelling soon or stored in the block that has low reliability to a server, e.g., the server 50 (FIG. 1). The uploading processor sends the partial log data preferentially over other scheduled transmissions by the uploading processor in order to minimize a risk of additional data copy within the storage unit 9 and a risk of loss of the partial log data. The uploading processor transmits the partial log data in response to receiving an instruction from the storage manager, e.g., the storage manager 22 (FIG. 1). In some embodiments, the partial log data is transmitted wirelessly. In some embodiments, the partial log data is transmitted via a wired connection. Following operation 512, two operations occur within the method 500. First, the method 500 returns to operation 510 and another block of the storage unit is analyzed. Second, the method proceeds to operation 514. Following transmission of the partial log data, the uploading processor continues to transmit log data based on scheduling for transmission until instructions for preferentially trans- mitting another partial log data is received. In some embodi- ments, the uploading processor is inhibited from transmit- ting partial log data, which has already been transmitted previously. That is, in response to the log data corresponding to the preferentially transmitted partial log data is scheduled to be transmitted by the uploading processor, the uploading processor will only transmit portions of the log data that were not previously preferentially transmitted.

In operation 514, the partial log data is received in a log data receiver, e.g., log data receiver 51 (FIG. 1), in a server, e.g., server 50 (FIG. 1). In response to receiving partial log data, the log data receiver instructs a server storage unit, e.g., storage unit 53 (FIG. 1), to store the partial log data in a buffer area, e.g., buffer area 55 (FIG. 1). The partial log data remains in the buffer area until a notification is received that the log data is complete.

In operation 516, a determination is made regarding whether an entirety of a piece of log data has been trans- mitted. In some embodiments, the determination is made using the storage manager, e.g., the storage manager 22 (FIG. 1). In some embodiments, the determination is made based on metadata stored with the partial log data associated with a piece of log data. In some embodiments, storage manager 22 manages a list, table, or queue of partial log data 202 of a log data 300 to manage the partial log data 202 which are not transmitted so that the determination is made when all the items in the list or the table are flagged, or the queue becomes empty. Once all partial log data having a specific log ID has been transmitted, the determination is made that an entirety of the log data has been transmitted.

In response to a determination that less than an entirety of the log data has been transmitted, the method 500 repeats operation 516. The method 500 continues to monitor the storage unit and the uploading processor to determine whether an entirety of the log data has been transmitted. In response to a determination that the entirety of the log data has been transmitted, the method proceeds to operation 518.

In operation 518, an upload completion notifier, e.g., the upload completion notifier 24 (FIG. 1), sends a notification of completion to the server, e.g., the server 50 (FIG. 1). The notification includes log ID information for the piece of log data that was completely transmitted. For example, the upload completion notifier will transmit a notification to the server of the completion of transfer of the entire piece of log data following the transmission of a last partial log data associated with a log ID. In some embodiments, the upload completion notifier along with uploading processor 23 sends the last partial log data 202 of the log data 300 with a flag which indicates that all the other partial log data 202 of the log data 300 are already transmitted to the server 50, without sending another message in addition to the data transfer message.

In operation 520, the log data receiver, e.g., log data receiver 51 (FIG. 1), receives the notification of completion from the upload completion notifier, e.g., upload completion notifier 24 (FIG. 1). In response to receiving complete log data, the log data receiver instructs the server storage unit to store the complete log data in log data area, e.g., log data area 54 (FIG. 1). In some embodiments, the log data receiver provides a notification to a user associated with the log data. In some embodiments, the notification includes an alert transmitted to the user via a wired or wireless network. In some embodiments, the notification includes an audio or visual alert. In some embodiments, the notification is sent to a mobile device of the user and the alert is displayed on the mobile device of the user.

In operation 522, a log data restorer, e.g., log data restorer 52 (FIG. 1), restores the log data from the partial log data received by the server, e.g., server 50 (FIG. 1) and stored in the buffer area, e.g., buffer area 55 (FIG. 1). The restored log data is moved to the log data area, e.g., log data area 54 (FIG. 1). The log data restorer retrieves partial log data from the buffer area in response to receiving an upload completion notification from the upload completion notifier. The log data restorer uses the log ID associated with each of the partial log data components in order to re-constitute the log data in full. In some embodiments, in response to comple- tion of the log data being re-constituted, the log data restorer transfers the log data to the log data receiver to send a notification to the user, as described above. The log data restorer also instructs the server storage unit, e.g., the storage unit 53 (FIG. 1), to store the re-constituted log data in the log data area.

One of ordinary skill in the art would understand that the method 500 is merely exemplary of a method implemented by a vehicle data collection system. In some embodiments, an order of operations of the method 500 is adjusted. For example, in some embodiments, the operation 504 is per- formed prior to the operation 502. In some embodiments, additional operations are included in the method 500. For example, in some embodiments, an alert is transmitted to the user indicating that partial log data is available for accessing. In some embodiments, at least one operation is omitted. For example, in some embodiments, a portion of the operation 522 transferring complete log data to a different portion of the storage unit is omitted.

Figure 6:
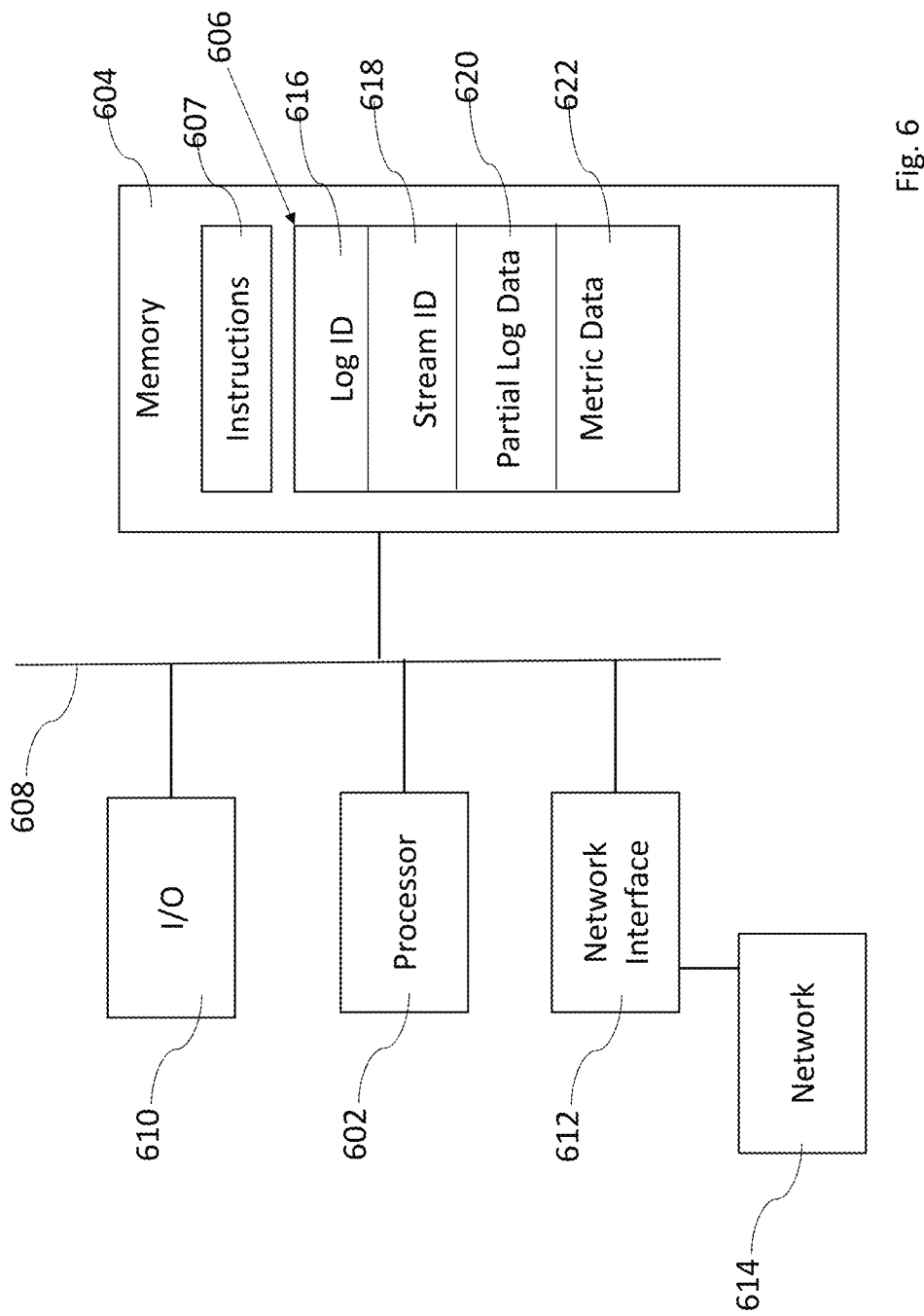
FIG. 6 is a schematic diagram of a system for implementing a vehicle data collection system in accordance with some embodiments.

FIG. 6 is a schematic view of a system 600 for imple- menting a vehicle data collection system in accordance with some embodiments. System 600 includes a hardware pro- cessor 602 and a non-transitory, computer readable storage medium 604 encoded with, i.e., storing, the computer pro- gram code 606, i.e., a set of executable instructions. Com- puter readable storage medium 604 is also encoded with instructions 607 for interfacing with external devices. The processor 602 is electrically coupled to the computer read- able storage medium 604 via a bus 608. The processor 602 is also electrically coupled to an input/output (I/O) interface 610 by bus 608. A network interface 612 is also electrically connected to the processor 602 via bus 608. Network interface 612 is connected to a network 614, so that proces- sor 602 and computer readable storage medium 604 are capable of connecting to external elements via network 614. The processor 602 is configured to execute the computer program code 606 encoded in the computer readable storage medium 604 in order to cause system 600 to be usable for performing a portion or all of the operations as described in vehicle data collection system 100 (FIG. 1) and/or method 500 (FIG. 5).

In some embodiments, the processor 602 is a central processing unit (CPU), a multi-processor, a distributed pro- cessing system, an application specific integrated circuit (ASIC), and/or a suitable processing unit.

In some embodiments, the computer readable storage medium 604 is an electronic, magnetic, optical, electromag- netic, infrared, and/or a semiconductor system (or apparatus or device). For example, the computer readable storage medium 604 includes a semiconductor or solid-state memory, a magnetic tape, a removable computer diskette, a random-access memory (RAM), a read-only memory (ROM), a rigid magnetic disk, and/or an optical disk. In some embodiments using optical disks, the computer readable storage medium 604 includes a compact disk-read only memory (CD-ROM), a compact disk-read/write (CD-R/W), and/or a digital video disc (DVD).

In some embodiments, the storage medium 604 stores the computer program code 606 configured to cause system 600 to perform a portion or all of the operations as described in vehicle data collection system 100 (FIG. 1) and/or method 500 (FIG. 5). In some embodiments, the storage medium 604 also stores information needed for performing a portion or all of the operations as described in vehicle data collection system 100 (FIG. 1) and/or method 500 (FIG. 5) as well as information generated during performing a portion or all of the operations as described in vehicle data collection system 100 (FIG. 1) and/or method 500 (FIG. 5), such as a log ID parameter 616, a stream ID parameter 618, a partial log data parameter 620, a metric data parameter 622, and/or a set of executable instructions to perform a portion or all of the operations as described in vehicle data collection system 100 (FIG. 1) and/or method 500 (FIG. 5).

In some embodiments, the storage medium 604 stores instructions 607 for interfacing external devices and components. The instructions 607 enable processor 602 to generate manufacturing instructions readable by the external devices and components to effectively implement a portion or all of the operations as described in vehicle data collection system 100 (FIG. 1) and/or method 500 (FIG. 5).

System 600 includes I/O interface 610. I/O interface 610 is coupled to external circuitry. In some embodiments, I/O interface 610 includes a keyboard, keypad, mouse, trackball, trackpad, and/or cursor direction keys for communicating information and commands to processor 602.

System 600 also includes network interface 612 coupled to the processor 602. Network interface 612 allows system 600 to communicate with network 614, to which one or more other computer systems are connected. Network interface 612 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described in vehicle data collection system 100 (FIG. 1) and/or method 500 (FIG. 5) is implemented in two or more systems 600, and information such as log ID parameter 616, stream ID parameter 618, partial log data parameter 620 and metric data parameter 622 exchanged between different systems 600 via network 614.

An aspect of this description relates to a vehicle data collection system. The vehicle data collection system includes a sensor configured to collect data. The vehicle data collection system further includes a non-transitory computer readable medium configured to store instructions, an application log, and a system log thereon. The vehicle data collection system further includes a processor connected to the non-transitory computer readable medium. The processor is configured to execute the instructions for receiving the collected data from the sensor, the application log, or the system log. The processor is further configured to execute the instructions for generating log data based on the collected data. The processor is further configured to execute the instructions for separating the log data into a plurality of partial log data. The processor is further configured to execute the instructions for generating metadata for each of the plurality of partial log data, wherein the metadata comprises reliability information for a portion of a storage unit where corresponding partial log data of the plurality of partial log data is to be stored. The processor is further configured to execute the instructions for instructing the storage unit to store each of the plurality of partial log data in the corresponding portion of the storage unit.

In some embodiments, the reliability information comprises erase count information. In some embodiments, the reliability information comprises erase time information or write time information. In some embodiments, the processor is further configured to execute the instructions for identifying a first partial log data of the plurality of partial log data having a risk of additional data copy or being lost above a predetermined threshold based on the reliability information for the first partial log data. In some embodiments, the processor is further configured to execute the instructions for instructing a transmitter to transmit the first partial log data prior to another scheduled transmission in response to a determination that the first partial log data has a risk of additional data copy or being lost above the predetermined threshold. In some embodiments, the processor is further configured to execute the instructions for receiving a data request from a server, wherein the processor is configured to generate the log data based on the collected data and the received data request. In some embodiments, the processor is further configured to execute the instructions for determining whether an entirety of the generated log data is transmitted; and instructing a transmitter to transmit a notification to a server in response to a determination that the entirety of the generated log data is transmitted. In some embodiments, the sensor is one of a plurality of sensors, and the processor is further configured to execute the instructions for generating stream identification (ID) information for each of the plurality of partial log data based on which sensor of the plurality of sensors collected the data associated with a corresponding partial log data of the plurality of partial log data. In some embodiments, the processor is further configured to execute the instructions for determining the reliability information based on the stream ID information for each of the plurality of partial log data.

An aspect of this description relates to a method. The method includes receiving collected data from a sensor, an application log, or a system log. The method further includes generating log data based on the collected data. The method further includes separating the log data into a plurality of partial log data. The method further includes generating metadata for each of the plurality of partial log data, wherein generating the metadata comprises generating the metadata comprising reliability information for a portion of a storage unit where corresponding partial log data of the plurality of partial log data is to be stored. The method further includes storing each of the plurality of partial log data in the corresponding portion of the storage unit. In some embodiments, generating the metadata includes generating the metadata using erase count information. In some embodiments, generating the metadata includes generating the metadata using erase time information or write time information. In some embodiments, the method further includes identifying a first partial log data of the plurality of partial log data having a risk of additional data copy or being lost above a predetermined threshold based on the wear state information for the first partial log data. In some embodiments, the method further includes transmitting the first partial log data prior to another scheduled transmission in response to a determination that the first partial log data has a risk of additional data copy or being lost above the predetermined threshold. In some embodiments, the method further includes receiving a data request from a server; and generating the log data based on the collected data and the received data request. In some embodiments, the method further includes determining whether an entirety of the generated log data is transmitted; and transmitting a notification to a server in response to a determination that the entirety of the generated log data is transmitted. In some embodiments, receiving collected data includes receiving the collected data from a plurality of sensors including the sensor, and the method further includes generating stream identification (ID) information for each of the plurality of partial log data based on which sensor of the plurality of sensors collected the data associated with a corresponding partial log data of the plurality of partial log data. In some embodiments, the method further includes determining the reliability information based on the stream ID information for each of the plurality of partial log data.

An aspect of this description relates to a vehicle data collection system. The vehicle data collection system includes a non-transitory computer readable medium configured to store instructions thereon. The vehicle data collection system further includes a processor connected to the non-transitory computer readable medium. The processor is configured to execute the instructions for receiving a first partial log data having a first log identification (ID). The processor is further configured to execute the instructions for instructing the first partial log data to be stored in a buffer area. The processor is further configured to execute the instructions for receiving a second partial log data having the first log ID. The processor is further configured to execute the instructions for receiving a notification of completion of transmission of log data having the first log ID. The processor is further configured to execute the instructions for re-constituting the log data using the first partial log data and the second partial log data in response to receiving the notification of completion of transmission. The processor is further configured to execute the instructions for instructing the re-constituted log data to be stored in a location other than the buffer area. In some embodiments, the processor is further configured to execute the instructions for instructing a transmitter to transmit an alert to a user in response to completion of re-constituting the log data.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A vehicle data collection system comprising:
a sensor configured to collect data;
a non-transitory computer readable medium configured to store instructions, and at least one of an application log or a system log thereon; and
a processor connected to the non-transitory computer readable medium, wherein the processor is configured to execute the instructions for:
receiving the collected data from the sensor and the at least one of the application log or the system log;
generating log data based on the collected data;
separating the log data into a plurality of partial log data;

generating metadata for each of the plurality of partial log data, wherein the metadata comprises reliability information for a first portion of a storage unit, wherein the first portion of the storage unit includes a first set of memory cells at a first location in the storage unit where corresponding partial log data of the plurality of partial log data is to be stored, the reliability information indicates a risk of corruption or loss of data stored at the first portion of the storage unit, the first portion of the storage unit has a first risk of corruption or loss of data, a second portion of the storage unit has a second risk, different from the first risk, of corruption or loss of data, and the second portion of the storage unit includes a second set of memory cells at a second location in the storage unit different from the first location; and
instructing the storage unit to store each of the plurality of partial log data in the corresponding portion of the storage unit.

2. The vehicle data collection system of claim 1, wherein the first risk of corruption or loss of data is based on a number of times the first set of memory cells is erased or overwritten, and the second risk of corruption or loss of data is based on a number of times the second set of memory cells is erased or overwritten.

3. The vehicle data collection system of claim 1, wherein the reliability information comprises at least one of a number of times the first portion of the storage unit is erased or a number of times to which the first portion of the storage unit is written.

4. The vehicle data collection system of claim 1, wherein the processor is further configured to execute the instructions for:
identifying a first partial log data of the plurality of partial log data having a risk of (a) additional data copy or (b) being lost being above a predetermined threshold based on the reliability information for the first partial log data.

5. The vehicle data collection system of claim 4, wherein the processor is further configured to execute the instructions for:
instructing a transmitter to transmit the first partial log data prior to another scheduled transmission in response to a determination that the first partial log data has a risk of additional data copy or being lost above the predetermined threshold.

6. The vehicle data collection system of claim 1, wherein the processor is further configured to execute the instructions for:
receiving a data request from a server, wherein the processor is configured to generate the log data based on the collected data and the received data request.

7. The vehicle data collection system of claim 1, wherein the processor is further configured to execute the instructions for:
determining whether an entirety of the generated log data is transmitted; and
instructing a transmitter to transmit a notification to a server in response to a determination that the entirety of the generated log data is transmitted.

8. The vehicle data collection system of claim 1, wherein the sensor is one of a plurality of sensors, and the processor is further configured to execute the instructions for:
generating stream identification (ID) information for each of the plurality of partial log data based on which sensor of the plurality of sensors collected the data associated with the corresponding partial log data of the plurality of partial log data.

9. The vehicle data collection system of claim 8, wherein the processor is further configured to execute the instructions for:

determining the reliability information based on the stream ID information for each of the plurality of partial log data.

10. A method comprising:

receiving collected data from a sensor and at least one of an application log or a system log;

generating log data based on the collected data;

separating the log data into a plurality of partial log data;

generating metadata for each of the plurality of partial log data, wherein the generated metadata comprises reliability information for a first portion of a storage unit, wherein the first portion of the storage unit includes a first set of memory cells at a first location in the storage unit is where corresponding partial log data of the plurality of partial log data is to be stored, the reliability information indicates a risk of corruption or loss of data stored at the first portion of the storage unit, the first portion of the storage unit has a first risk of corruption or loss of data, a second portion of the storage unit has a second risk, different from the first risk, of corruption or loss of data, and the second portion of the storage unit includes a second set of memory cells at a second location in the storage unit different from the first location; and storing each of the plurality of partial log data in the corresponding portion of the storage unit.

11. The method of claim 10, wherein the first risk of corruption or loss of data is based on a number of times the first set of memory cells is erased or overwritten, and the second risk of corruption or loss of data is based on a number of times the second set of memory cells is erased or overwritten.

12. The method of claim 10, wherein the reliability information comprises write time information.

13. The method of claim 10, further comprising:

identifying a first partial log data of the plurality of partial log data having a risk of (a) additional data copy or (b) being lost being above a predetermined threshold based on the reliability information for the first partial log data.

14. The method of claim 13, further comprising:

transmitting the first partial log data prior to another scheduled transmission in response to a determination that the first partial log data has a risk of additional data copy or being lost above the predetermined threshold.

15. The method of claim 10, further comprising:

receiving a data request from a server; and generating the log data based on the collected data and the received data request.

16. The method of claim 10, further comprising:

determining whether an entirety of the generated log data is transmitted; and transmitting a notification to a server in response to a determination that the entirety of the generated log data is transmitted.

17. The method of claim 10, wherein receiving collected data comprises receiving the collected data from a plurality of sensors including the sensor, and the method further comprises:

generating stream identification (ID) information for each of the plurality of partial log data based on which the sensor of the plurality of sensors collected the data associated with the corresponding partial log data of the plurality of partial log data.

18. The method of claim 17, further comprising:

determining the reliability information based on the stream ID information for each of the plurality log data.

\* \* \* \* \*